United States Patent [19]

Simonsen

[11] Patent Number: 4,653,332

[45] Date of Patent: Mar. 31, 1987

[54] MASS FLOW METER WORKING ON THE CORIOLIS PRINCIPLE

[75] Inventor: Jens K. Simonsen, Nordborg, Denmark

[73] Assignee: Danfoss A/S, Nordborg, Denmark

[21] Appl. No.: 796,716

[22] Filed: Nov. 12, 1985

[30] Foreign Application Priority Data

Nov. 27, 1984 [DE] Fed. Rep. of Germany ....... 3443234

[51] Int. Cl.$^4$ ................................................ G01F 1/84
[52] U.S. Cl. ................................................ 73/861.38
[58] Field of Search .......................... 73/861.37, 861.38

[56] References Cited

U.S. PATENT DOCUMENTS 3,080,750  3/1963  Wiley et al. ..................... 73/861.37
3,329,019  7/1967  Sipin ................................. 73/861.37

Primary Examiner—Herbert Goldstein
Attorney, Agent, or Firm—Wayne B. Easton

[57] ABSTRACT

The invention relates to a mass flow meter which operates on the coriolis principle. The meter has two straight and parallel measuring tubes with two axially aligned compensating supply and discharge tubes arranged in parallel to the measuring tubes. The compensating tubes have approximately the same coefficient of expansion as said measuring tubes. A mounting member having supply and discharge passage has the juxtaposed ends of the compensating tubes connected thereto. The opposite ends of the compensating tubes connect to the respective juxtaposed ends of the measuring tube. An oscillator drives the measuring tubes in opposite directions and sensors are provided for detecting movements of the measuring tubes from which mass flow can be determined.

7 Claims, 6 Drawing Figures

U.S. Patent  Mar. 31, 1987  Sheet 1 of 2  4,653,332
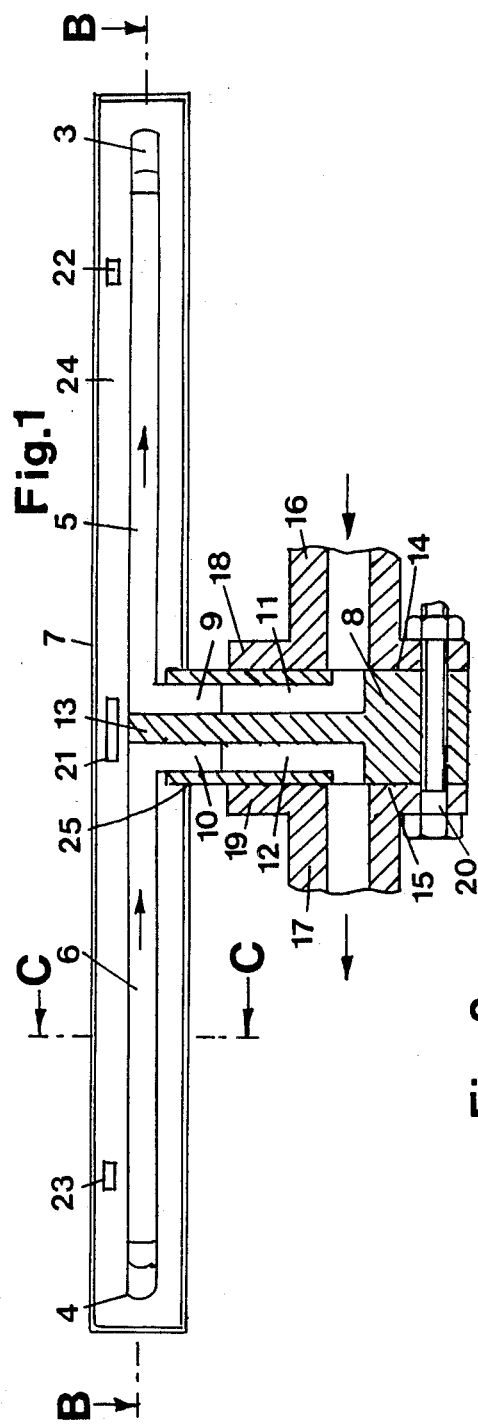
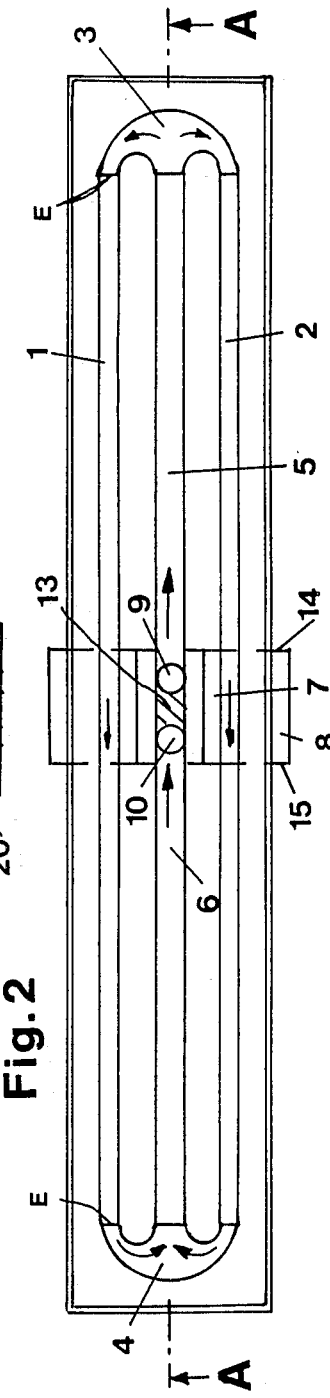
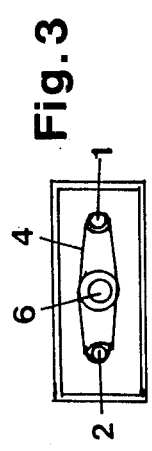

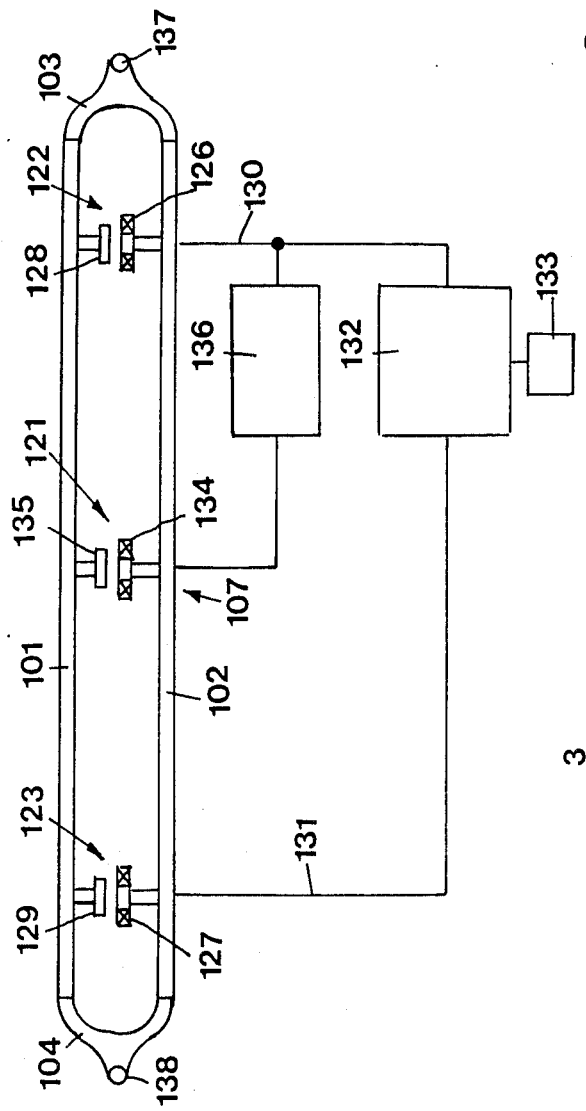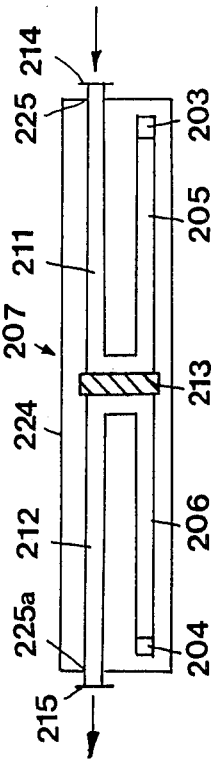

MASS FLOW METER WORKING ON THE CORIOLIS PRINCIPLE

The invention relates to a mass flow meter working on the Coriolis principle, in which two juxtaposed measuring tubes are mechanically interconnected at their ends and connected in parallel mechanically with the aid of two tube connectors which, in turn, are each connected to a connection by a supply and a discharge passage, wherein an oscillator driving the measuring tubes in opposite senses is provided and wherein the measuring tubes are associated at a spacing from the oscillator with sensors for receiving measuring signals from which the mass flow can be determined.

In a known meter of this kind (EP-OS 109,218), a cylindrical container provided at its ends with connections for the supply and discharge of the medium to be measured and with dividing walls in the middle carries two U-shaped bent tubes which communicate with the interior of the container at both sides of the dividing walls. The container therefore forms the tube connectors and the supply and discharge passages. The adjacent limbs of the U-shaped tubes are mechanically interconnected near the container by lugs which define the ends of the actual measuring tubes which can be oscillated in opposite senses by the oscillator. The oscillator engages the middle of the web of the U. The sensors are disposed at the transition of the web with the rectilinear tube limbs. The particular flow of mass can be determined at both ends of the web of the U from the difference of the phases of the oscillatory motion. Since the oscillating measuring tubes must have a certain length but project laterally from the container, the resulting meter is bulky in the lateral direction.

The invention is based on the problem of providing a mass flow meter of the aforementioned kind which projects to only a small extent laterally.

This problem is solved according to the invention in that the measuring tubes are straight and parallel, that compensating tubes respectively extend from a tube connector to a central zone approximately at the centre of the tube and have substantially the same coefficient of thermal expansion as the measuring tubes, and that the supply and discharge passages extend from this central zone to the associated connection.

In this construction, rectilinear measuring tubes are used instead of the bent measuring tubes. Consequently, the lateral extent is small. The measuring tubes can extend parallel to the pipe in which the meter is changed over. However, since the tube connectors have a large axial spacing from each other, changes in length occur as a result of temperature fluctuations. If the tube connectors form a fixed constructional unit together with the connections as is usual, the position of the unit being spacially fixed by being applied to the pipe, the change in length leads to axial stresses in the measuring tubes, through which the oscillatory behaviour is altered and thus the measurement is falsified. Axial stresses can also occur because of wrong clamping of the appliance or for other reasons. Consequently, the invention provides for the compensating tubes. Upon fluctuations in temperature, these undergo the same change in length as the measuring tubes so that no axial stresses are exerted on the measuring tubes themselves. The result of the measurement is therefore independent of temperature.

Preferably, the compensating tubes are fixed to each other in the central zone. In this way, the measuring tubes, the compensating tubes and the tube connectors form a structural unit of high strength.

In a preferred example, a common carrier for holding the measuring and compensating tubes is fixed to the compensating tubes in the central zone. By means of this carrier, the entire measuring appliance can be mounted on a support. Practically no noise is transmitted through this mechanical bridge despite the oscillations that are generated.

Desirably, the compensating tubes extend in the plane of the measuring tubes. This gives a very compact construction.

With particularr advantage, the compensating tubes are disposed between the measuring tubes. This gives a symmetrical construction which facilitates even more accurate measurements. In addition, because of the symmetrical construction, a defined node is produced in the central zone for all the six possible linear and rotary movements so that, when fixed at this point, it is possible to obtain perfect insulation of the resonance frequency from the surroundings.

In a preferred embodiment, the measuring and compensating tubes are enclosed by a housing and connected thereto only by way of the supply and discharge passages at the places where they go through the wall of the housing. Such a housing can be closed with a hermetic seal and possibly evacuated so that no condensation is formed on the tubes that might influence the accuracy of measurement. Since the connection is only by way of the supply and discharge passages, the measuring tubes remain uninfluenced by stresses that could arise at the housing as a result of the securing.

Preferably, the throughgoing positions are adjacent to the central zone. Since no temperature-dependent elongations occur at that position, there is no tendency at all for the housing to transmit interfering forces to the tube system.

In a meter in which the sensors are disposed in front of and behind the oscillator, which is arranged in the middle of the measuring tubes and detect the measuring tube positions relatively to each other, it is advisable for the spacing of the sensors from the ends of the measuring tubes to be less than that from the centres of the measuring tubes. With this spacing of the sensors, one can detect the largest phase difference. The sensors should, however, also have a small spacing from the ends of the measuring tubes so that an adequately large measuring signal can be detected. The optimum position can be readily found by trial and error.

Examples of the invention will now be described in more detail with reference to the drawing, wherein FIG. 1 is a longitudinal section on the line A—A in FIG. 2;

FIG. 2 is a horizontal section on the line B—B in FIG. 1;

FIG. 3 is a section on the line C—C in FIG. 1;

FIG. 4 is a spacial diagram of the measuring and compensating tubes;

FIG. 5 is a diagrammatic representation of the circuit for operating the oscillator and sensors; and FIG. 6 is a longitudinal section through a modified embodiment.

In the mass flow meter accordinig to FIG. 1, two straight and parallel measuring tubes 1 and 2 extending in the same plane are connected at their ends E to tube connectors 3 and 4, respectively.

Two compensating tubes 5 and 6 each having about half the length of one measuring tube extend in the same plane as the measuring tubes and between same from the tube connector 3 or 4 up to a central zone 7 at the centres of the measuring tubes.

The confronting sides of the compensating tubes 5 and 6 are interconnected by being connected to a common carrier 8. In the present example, the connection is effected by inserting bent tubular spigots 9 or 10 in the bores defined by the ends of supply and discharge passages 11 or 12 and by soldering to an upstanding wall 13 of the carrier. The two ends of the carrier 8 form connections 14 and 15 to which tube sections 16 or 17 of a conventional flow pipe can be connected by their flanges 18 or 19 with the aid of screws 20.

In the central zone 7 there is an oscillation generator 21 which is adapted to set the measuring tubes 1 and 2 into oppositely directed oscillations in their plane. Oscillation takes place over the free length of the measuring tubes 1 and 2, that is to say between their ends E at which they are mechanically fixed to the tube connectors 3 or 4. Sensors 22 and 23 which detect the particular spacing of the measuring tubes 1 and 2 from each other in the central zone are so placed that they have a smaller spacing from the ends E than from the centres of the tubes. Their construction is shown by way of example in FIG. 4.

The measuring tubes 1, 2, the tube connectors 3, 4 and the compensating tubes 5, 6 are disposed in a housing 24 which in practice consists of an upper portion and a lower portion and has a through passage 25 for the supply and discharge passages 11, 12 hermetically sealed at the central zone 7. The housing 24 is connected to the tube system only at this through passage. The interior 26 is evacuated so that the formation of condensation on the measuring and compensating tubes is not possible.

The material of the measuring tubes 1, 2 and the compensating tubes 5, 6 should have substantially the same coefficient of thermal expansion. Preferably, the material is the same, it only being necessary for the cross-section of the compensating tubes to be somewhat larger than that of the measuring tubes. Consequently, upon a change in temperature, the sum of the changes in length of the compensating tubes 5, 6 is equal to the change in length of the measuring tubes 1, 2. The measuring tubes therefore undergo no axial stresses caused by temperature that might falsify the measuring result.

It will be assumed that a medium, particularly a liquid, flows through the meter in the direction of the arrows. The two measuring tubes 1 and 2 will then form a parallel circuit. If, now, the measuring tubes 1, 2 are set into oscillation in opposite senses in their planes by means of the oscillator 21, at resonance frequency if at all possible, then Coriolis forces exerted by the mass of the flowing medium bring about a phase dispacement in the oscillation of the measuring tubes along their length. By reason of the oscillations in opposite senses, this phase displacement can be very readily determined by sensors 22, 23 which detect the positions of the measuring tubes 1, 2 relatively to each other. Since the sensors are disposed near the ends E, the phase displacement is comparatively large. Since a certain spacing remains from the ends E, the measuring signal is still sufficiently large in comparison with all interference signals.

In FIG. 4, the measuring and compensating tubes are illustrated diagrammatically. One extreme oscillatory position of the measuring tubes 1, 2 is shown in broken lines. It will be seen that, because of the opposed movement, the oscillatory forces at the tube connectors 3, 4 balance each other out and therefore oscillations are not diverted to the outside in this plane by way of the central carrier, so that the associated noise is likewise not transmitted.

Because of the oscillation convexity, there is periodic upsetting of the compensating tubes 5, 6. Since the upsetting forces are equal and opposite, they balance each other out in the region of the carrier 8. They are therefore likewise not transmitted to the surroundings. Because of the symmetric construction, the same applies to all other translatory and rotary movements that could occur as a result of the oscillations. The junction of the two compensating tubes 5, 6 therefore forms a node K, so that no or hardly any oscillating noises are transmitted to the outside through the carrier.

The supply and discharge passages 11, 12 extend within the carrier 8 which is sufficiently strong to carry the entire arrangement. Since the connections 14, 15 of the carrier are likewise still in the central zone 7, there is no fear of disruptive thermal elongation. The same applies with respect to the connecting point between the housing 24 and carrier 8 in the region of the throughway 25. Any changes in the dimensions of the housing and carrier caused by the temperature are likewise negligibly small at this position.

The most varied kind of measuring signal detectors are suitable for determining the phase difference in the oscillations between the two sensors 22 and 23. In particular, the sensors should work without contact. This can be done optically, magnetically, capacitatively or otherwise. Determination of the phase position can for example take place by measuring the acceleration, the velocity or the amplitude. The measuring signal need not be an oscillation instead, one can measure the period during which the spacing of the measuring tubes exceeds or falls below certain limiting values.

In the FIG. 5 embodiment, in which corresponding integers are referenced with numerals increased by 100 in relation to FIGS. 1 to 4, there are electromagnetic sensors 122 and 123 each comprising an induction coil 126 or 127 secured to the one measuring tube 102 and a permanent magnet 128 or 129 secured to the other measuring tube 101. Because of the relative oscillatory movement between the two parts of the sensors, an A.C. voltage is induced in the induction coil, that is applied by conductors 130 and 131 to a detector 132 which is provided with indicating means 133 for the through-flow.

The oscillator 121 is defined by a drive coil 134 connected to measuring tube 102 and a permanent magnet 135 connected to measuring tube 101. Drive coil 134 is fed by a driving circuit 136 with an A.C. voltage that determines the oscillations of the measuring tubes 101, 102. It should be as close as possible to the resonance frequency of these tubes so that the least possible power will produce the transverse motion of the measuring tubes necessary for the measurement. By feeding the measuring signal back along the conductor 130, the resonance condition is particularly easy to achieve.

The two compensating tubes are in this embodiment in a different plane from the measuring tubes 101 and 102. For this purpose, the tube connectors 103, 104 have upwardly projecting spigots 137, 138 by which the compensating tubes are connected in a plane above that of the drawing.

In the FIG. 6 embodiment, parts corresponding to those in FIGS. 1 to 4 have reference numerals increased by 200. The compensating tubes 205 and 206 are again in a plane between the parallel measuring tubes (not shown). In the central zone 207, the compensating tubes are interconnected by way of a securing point 213. The supply and discharge passages 211 and 212 are substantially parallel to the measuring and compensating tubes. The places 225 and 225a where they pass through the housing 224 are at opposite end walls of the said housing. This is also the place of connection to the housing. If the housing 224 and the supply and discharge passages 211 and 212 have different coefficients of thermal expansion, this will not influence the measurement because any axial stresses in the passages will balance each other out and not affect the measuring tubes.

I claim:

1. A mass flow meter operable on the Coriolis principle, comprising, two straight parallel arranged measuring tubes of the same length and having their respective ends in juxtaposition, two straight axially aligned compensating tubes disposed in parallel to said measuring tubes, said compensating tubes having inner ends in juxtaposition with each other and outer ends in juxtaposition with the corresponding ends of said measuring tubes, a mounting member having supply and discharge passages with external ends connectable to external supply and discharge means and internal ends in juxtaposition, said compensating tubes having their inner ends connected to either said supply or discharge passages and their outer ends connected to the corresponding outer ends of said measuring tubes, oscillator means for driving said measuring tubes in opposite directions, and sensor means for detecting movements of said measuring tubes from which mass flow can be determined.

2. A mass flow meter according to claim 1 wherein said compensating tubes have approximately the same coefficient of expansion as said measuring tubes.

3. A mass flow meter according to claim 1 wherein said juxtaposition ends of said compensating tubes are in fixed relation to each other in said mounting member.

4. A mass flow meter according to claim 1 wherein said compensating tubes are in the same plane as said measuring tubes.

5. A mass flow meter according to claim 1 wherein said compensating tubes are disposed between said measuring tubes.

6. A mass flow meter according to claim 1 including a housing for enclosing said measuring and compensating tubes, said housing being connected only to said mounting member.

7. A mass flow meter according to claim 1 wherein said oscillator means is mounted midway between the ends of said measuring tubes, said sensor means being spaced near the ends of said measuring tubes and closer thereto than to said oscillator means.

* * * * *